United States Patent [19]

Bateman

[11] 4,030,065

[45] June 14, 1977

[54] TERRAIN CLEARANCE WARNING SYSTEM FOR AIRCRAFT

[75] Inventor: Charles Donald Bateman, Bellevue, Wash.

[73] Assignee: Sundstrand Corporation, Rockford, Ill.

[22] Filed: July 19, 1976

[21] Appl. No.: 706,519

[52] U.S. Cl. .................... 340/27 AT; 73/178 T; 235/150.2; 244/180; 343/7 TA; 343/112 CA

[51] Int. Cl.² ............................................. G01C 5/00

[58] Field of Search ............ 73/178 R, 178 T, 179; 179/15 A; 235/150.2; 244/180, 182; 340/16 R, 16 C, 16 M, 27, 29, 52 H, 56, 62, 66, 258, ; 343/5 LS, 7 R, 7 TA, 7 ED, 7 PF, 7.7, 8, 9, 12 R, 12 A, 108 R, 112 A, 112 CA, 112 S

[56] References Cited

UNITED STATES PATENTS

| | | | |
|---|---|---|---|
| 2,445,712 | 7/1948 | Forbes | 340/27 R X |
| 2,631,277 | 3/1953 | Skoller | 343/7 R X |
| 2,632,881 | 3/1953 | Swartzel et al. | 340/26 |
| 2,809,340 | 10/1957 | Bernhart | 318/584 |
| 2,930,035 | 3/1960 | Altekruse | 343/7 TA |
| 3,206,745 | 9/1965 | Waters | 343/5 |
| 3,209,353 | 9/1965 | Weiner et al. | 343/7 TA |
| 3,210,760 | 10/1965 | Olson et al. | 343/7 TA |
| 3,213,447 | 10/1965 | Burrows et al. | 343/7 TA |
| 3,241,068 | 3/1966 | Moulton | 343/7 TA X |
| 3,243,813 | 3/1966 | Summers | 343/16 |
| 3,245,076 | 4/1966 | Le Tilly et al. | 343/7 TA |
| 3,287,724 | 11/1966 | Zuranick et al. | 343/7 TA |
| 3,302,198 | 1/1967 | Selvin et al. | 343/7 TA |
| 3,315,255 | 4/1967 | Sullivan et al. | 343/7 TA |
| 3,325,807 | 6/1967 | Burns et al. | 343/16 |
| 3,355,733 | 11/1967 | Mitchell et al. | 343/7 TA |
| 3,396,391 | 8/1968 | Anderson et al. | 343/7 TA |
| 3,533,105 | 10/1970 | Sharp | 343/7 TA |
| 3,553,688 | 1/1971 | Bechtel | 343/7 TA |
| 3,680,046 | 7/1972 | Bergey et al. | 340/27 NA X |
| 3,685,034 | 8/1972 | Hedrick | 340/27 NA X |
| 3,706,988 | 12/1972 | Bayce et al. | 343/7 TA X |
| 3,815,132 | 6/1974 | Case, Jr. et al. | 343/7 TA |
| 3,924,262 | 12/1975 | Melancon | 340/27 AT |
| 3,925,751 | 12/1975 | Bateman et al. | 340/27 AT |
| 3,936,796 | 2/1976 | Bateman | 340/27 AT |
| 3,944,968 | 3/1976 | Bateman et al. | 340/27 AT |
| 3,946,358 | 3/1976 | Bateman | 340/27 R |
| 3,947,809 | 3/1976 | Bateman | 340/27 AT |

FOREIGN PATENTS OR APPLICATIONS 782,142  4/1968  Canada ........................... 340/27 R

OTHER PUBLICATIONS

"The Sundstrand Ground Proximity Warning System", undated publication of Sundstrand Data Control, Inc., 13–475.

Primary Examiner—Stephen G. Kunin
Attorney, Agent, or Firm—Ted E. Killingsworth; Michael B. McMurry; William R. Peoples

[57] ABSTRACT

By utilizing a radio altimeter in conjunction with a measure of the aircraft speed, landing gear position and flap position, an aircraft terrain warning system is made possible which provides a voice warning indicating that the aircraft is too low with respect to the terrain when the aircraft is above a predetermined speed. For aircraft speeds below the predetermined speed, a voice warning is provided when the aircraft is below a predetermined altitude with the landing gear up indicating that the aircraft is too low with the gear up and when the gear is down and the flaps are not in a landing position and the aircraft descends below a second predetermined altitude a voice warning is generated indicating that the aircraft is too low with flaps up.

51 Claims, 3 Drawing Figures

TERRAIN CLEARANCE WARNING SYSTEM FOR AIRCRAFT

BACKGROUND OF THE INVENTION

The invention relates to the field of aircraft ground proximity warning systems and more particularly to systems providing warning of insufficient terrain clearance.

Prior art ground proximity warning systems, such as the terrain clearance system disclosed in Bateman U.S. Pat. No. 3,946,358 and Bateman et al U.S. Pat. No. 3,944,968, both of which are assigned to assignee of this application, utilized both landing gear and landing flap position signals combined with radio altitude signals to generate a warning in the event terrain clearance is less than predetermined limits. These systems would have provided timely warnings for certain controlled flight into terrain incidents where the aircraft was flown into the terrain when the aircraft was not in a landing configuration. However, there are instances where a pilot may extend the landing gear to act as an aerodynamic brake or drag during certain portions of a flight. Lowering the landing gear in the prior art ground proximity warning systems inhibits the terrain warning mode which has the effect of eliminating a terrain warning protection capability under certain circumstances when it in fact might be needed.

In addition, there have been instances in the past when the flight crew have misread the barometric altimeter by 10,000 feet and as a result have unknowingly flown at cruising speeds within a very close proximity to the ground. The prior art terrain clearance warning systems, as represented in U.S. Pat. No. 3,946,358, in many instances will not provide sufficient warning time at these higher cruise speeds. This is due in part to the fact that they do not provide a warning until the aircraft is within 200 feet of the ground unless it also is descending at a barometric descent rate at a rate great enough to raise the warning threshold to 600 feet.

A failure of the gear or flap switch utilized for a ground proximity warning system input can lead to a loss of confidence in the system since such a failure will manifest itself on a landing approach with a continuous pull-up warning. Since the cause of the problem is not immediately obvious, pilots will tend to lose faith in the system.

Another cause of lack of faith in ground proximity warning systems is the fact that heretofore the majority of the warnings have been in the nature of a single imperative command to pull-up. It has been discovered that pilots are reluctant to immediately respond with a maneuver when they are not certain what the circumstances are that have triggered the warning.

SUMMARY OF THE INVENTION

It is therefore an object of the invention to provide a terrain warning system which will generate a voice warning indicating that the aircraft is too low for the terrain.

It is a further object of the invention to provide a terrain clearance warning system for aircraft wherein the warning criteria with respect to the proximity of terrain are varied as a function of aircraft speed and voice warnings are generated to indicate that the aircraft is too low with respect to the terrain.

It is another object of the invention to provide a terrain clearance warning system wherein a voice warning is provided to indicate that the aircraft is too low with respect to the terrain and, for certain aircraft speeds, that the aircraft is too low with the landing gear up.

It is still a further object of the invention to provide a terrain clearance warning system wherein voice warnings are provided to indicate, depending upon the aircraft's speed, that the aircraft is too low with respect to the terrain or that the aircraft is too low with the flaps up.

It is yet another object of the invention to provide a terrain clearance warning system wherein voice warnings are provided to indicate that the aircraft is too low with respect to the terrain wherein the altitude utilized to trigger this warning varies as a function of aircraft speed, and further for aircraft speeds below a predetermined value that the aircraft is too low with the gear up, or that the aircraft is too low with the flaps up.

The invention utilizes signals from a radio altimeter to determine the aircraft's actual altitude above the terrain. In addition, the aircraft uses a signal representing the aircraft's speed such as air speed or Mach number along with signals indicating whether the flaps and landing gear are up or down. For example, when the aircraft descends within 1,000 feet of the ground at over a predetermined speed such as 0.45 Mach, a voice warning will be given indicating the aircraft is too low with respect to the terrain unless the landing gear and flaps are both lowered. In addition, the altitude at which the terrain voice warning is given is varied as a function of aircraft speed in order to increase warning times during initial approach and descent and phases of operation. When the aircraft descends below 500 feet with the landing gear up below a predetermined speed such as 0.35 Mach a voice warning will be given indicating the aircraft is too low with the gear up. By the same token, when the flaps are not in a landing position and the aircraft approaches within 200 feet of the ground with the landing gear down, a voice warning will be given that the aircraft is too low with the flaps up.

By utilizing the voice warnings indicating the conditions which gave rise to the warning, the pilot's confidence and acceptance of the system are significantly enhanced, thereby, substantially increasing the effectiveness of the system in actual operating environments. Also, by increasing the altitude at which a terrain clearance warning can be generated to 1,000 feet when the aircraft is at cruise speed, unintended high speed flight near the ground can be avoided.

DETAILED DESCRIPTION OF THE INVENTION

Figure 1:
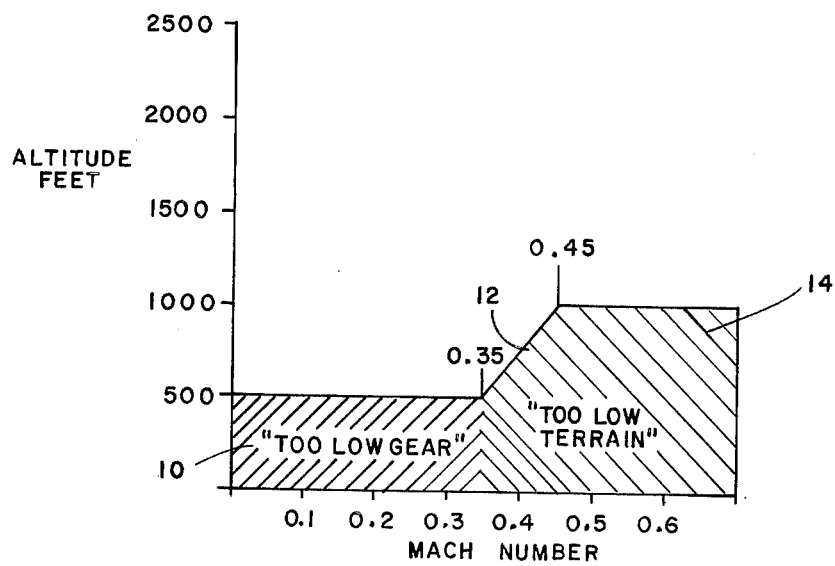
FIG. 1 is a graphical illustration of the relationship between aircraft altitude and speed for generating a terrain clearance warning when the landing gear is up.

In FIG. 1 of the drawings is illustrated graphically the relationship between aircraft speed as represented in Mach number and the aircraft's altitude above ground for generating a terrain clearance warning signal when the aircraft's landing gear is up. For example, whenever the aircraft has a speed of less than 0.35 Mach and descends within 500 feet of the terrain, a too low, gear voice warning will be given as indicated by the cross-hatched portion 10 of FIG. 1. For aircraft speeds between 0.35 and 0.45 Mach, the warning boundary indicated by line 12 will be essentially dependent on the aircraft speed and the voice warning will indicate that the aircraft is too low with respect to the terrain. In other words, for higher speeds the altitude at which a warning will be given is also greater. For aircraft speeds in excess of 0.45 Mach, the too low, terrain voice warning will be given any time the aircraft aproaches within 1,000 feet of the terrain as indicated by the cross-hatched portion 14 of FIG. 1.

Figure 2:
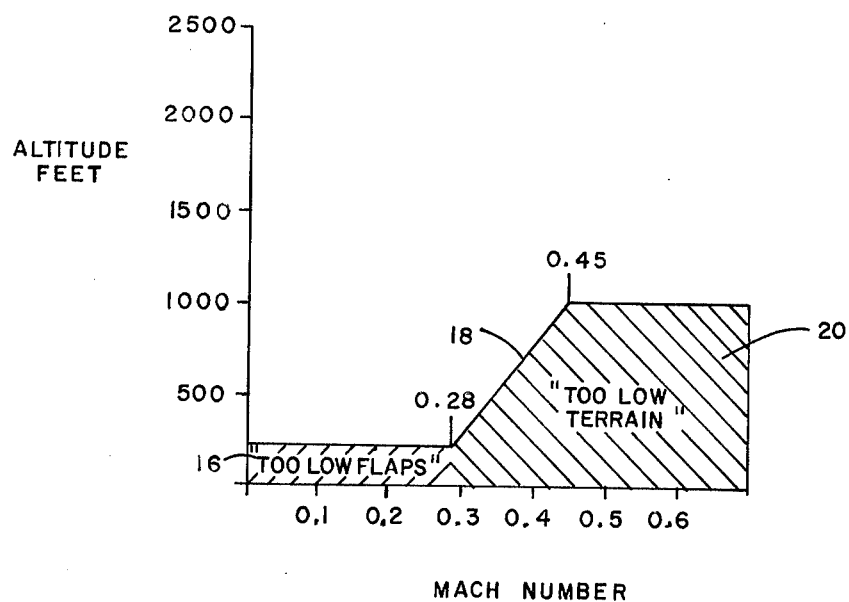
FIG. 2 is a graphical illustration of the relationship between aircraft altitude and speed for generating a terrain clearance warning when the aircraft's flaps are up and the landing gear is down.

Similarly, the graph in FIG. 2 illustrates the operation of the terrain clearance warning system when the landing gear is down but the flaps are not in a landing setting. The cross-hatched portion 16 of FIG. 2 indicates that a too low, flaps voice warning will be given when the aircraft has a speed of less than 0.28 Mach and is within 200 feet of the terrain. When the aircraft has a speed of between 0.28 Mach and 0.45 Mach a too low, terrain warning will be given if the aircraft should descend below line 18 for a given Mach number between 0.28 and 0.45. When the aircraft has a speed of greater than 0.45 Mach a too low, terrain warning will be given, as indicated by the cross-hatched area 20 of FIG. 2, whenever the aircraft decends within 1,000 feet of the terrain.

It is thus apparent from the characteristics illustrated in both FIGS. 1 and 2 that both the character and the altitude at which warnings are given are dependent upon the aircraft's speed. In addition, the altitude and the character of the type warning given are also dependent upon the position of the landing gear and flaps. A comparison of the graphs in FIGS. 1 and 2 will also illustrate the fact that when the aircraft is proceeding with a relatively high rate of speed, 0.45 Mach or over, with both the landing gear up and the flaps up a terrain warning is given for relatively high altitudes thereby providing timely warning in cases where the aircraft is inadvertently flying at cruise speeds near the ground.

Figure 3:
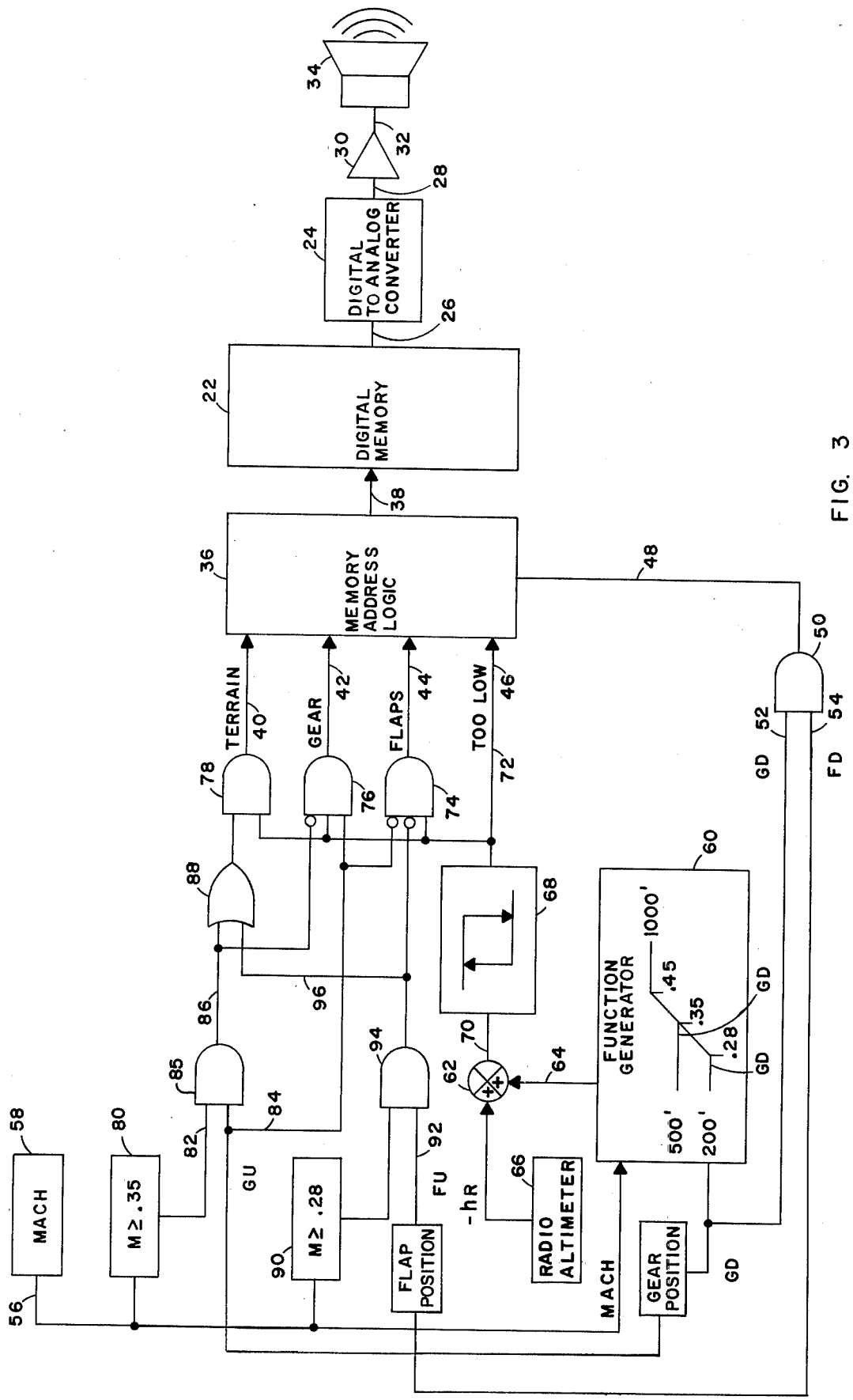
FIG. 3 is a functional block diagram for a circuit for implementing the warning curves of FIGS. 1 and 2.

A functional block diagram for implementing the terrain warning systems having the characteristics illustrated in the graphs of FIGS. 1 and 2 is presented in FIG. 3. In the preferred embodiment of the invention as illustrated in FIG. 3, a digital memory 22 contains the sequence of bits required to form a word. A digital to analog convertor 24 receives the bits from memory 22 over line 26 and converts the bit stream into an analog signal which in turn is transmitted over line 28 to an amplifier 30. The amplified analog signal is transmitted over line 32 to a speaker 34 for the production of the appropriate words. The bits contained in the memory are selected for transmission to the digital analog converter 24 by means of a memory address logic 36. A similar voice generating system is disclosed in Bateman U.S. Pat. No. 3,925,751. The memory address logic 32 in turn is controlled by a plurality of inputs 40, 42, 44, and 46 which indicate that portions of the digital memory 22 should be selected to form the words "terrain", "gear", "flaps" and "too low" respectively. The memory address logic 36 is inhibited by means of a signal transmitted over line 48 from an AND gate 50. When the signal GD meaning the landing gear is down is applied over line 52 to AND gate 50 and a signal FD indicating that the flaps are down or in a landing position is transmitted over line 54 an inhibit signal will be transmitted over line 48 to the memory address logic to prevent the generation of any terrain clearance warnings. Thus, there will be no terrain clearance warnings when the landing gear is down and the flaps are in a landing setting.

A signal representing aircraft speed is applied over a line 56 from a Mach meter 58 or similar device to a function generator 60. The function generator 60 applies a signal to a positive terminal of a summing junction 62 over line 64 wherein the signal on line 64 will be scaled to represent 200 feet for 0.28 Mach or less, between 200 and 500 feet for speeds between 0.28 and 0.35 Mach with the landing gear down, and between 500 and 1,000 feet for speeds between 0.35 and 0.45 Mach. For all speeds greater than 0.45 Mach, the output of the function generator will be a signal that represents 1,000 feet. A radio altimeter 66 provides an altitude signal $h_R$ which is negative in polarity and used as an input to another positive terminal of the summing junction 62. A comparator 68 receives the output from the summing junction 62 over line 70, and generates a high or positive logic signal on line 72 when the aircraft is below a desired altitude wherein either one or the other or both of the gear and flaps are up thereby immediately initiating the generation of the words "too." A positive logic signal on line 72 will also serve to enable each of a plurality of gates including 74, 76 and 78 which control the initiating of signals over lines 40, 42, 44, and 46 that in turn result in generating the desired words by means of memory address logic 36.

A comparator circuit 80 connected to line 56 generates a positive logic signal on line 82 when the aircraft's speed is greater than 0.35 Mach. In the event that the landing gear is up, as indicated by means of a positive signal applied to line 84, an AND gate 85 having both lines 82 and 84 as inputs will transmit a positive logic signal over line 86 to an OR gate 88. The OR gate 88 will transmit the positive signal on line 86 to a second input terminal on AND gate 78 thereby cooperating with the positive signal on line 72 to initiate the generation of the word "terrain." This operation of the circuit in FIG. 3 would correspond to line 12 in the graph of FIG. 1. A positive signal on line 86 which indicates that the aircraft speed is above 0.35 Mach will be applied by means of an inverter terminal to AND gate 76 thereby having the effect of inhibiting the generation of the word "gear." Thus as it can be seen from FIG. 1 for any aircraft speeds over 0.35 Mach, the word "gear" will not be generated.

In the event that the aircraft's speed is greater than 0.28 Mach as measured by a comparator circuit 90, and the aircraft's flaps are not in a landing setting, as indicated by a positive logic signal on line 92, an AND gate 94 will generate a positive logic signal on line 96. A positive logic signal on line 96 will be transmitted through the OR gate 88 to the AND gate 78 thereby initiating the generation of the word "terrain." By the same token, a positive logic signal on line 96 as input through an inverting input to AND gate 74 will tend to inhibit the generation of the word "flaps." The operation of this portion of the logic circuitry can be seen to relate to the portion indicated by line 18 of the graph of FIG. 2.

When the aircraft has a speed of less than 0.35 Mach with the landing gear up, corresponding to the portion 10 of the graph in FIG. 1, line 82 will have a low logic signal thereon thereby producing a low signal on line 86 thus tending to inhibit the generation of the word "terrain." However, the high signal on line 84 will cooperate with a low signal on line 86 to generate the word "gear" by means of AND gate 76. Thus, for aircraft speeds below 0.35 Mach, the too low gear warning will be generated.

In the event that the aircraft has a speed of less than 0.28 Mach, the comparator 90 will generate a low signal thus tending to turn off gate 94 and producing a low signal on line 96. This will cooperate with a similar low signal on line 86 to inhibit the AND gate 78 thereby preventing the generation of the word "terrain." Assuming the landing gear is down, a low signal on line 96 will cause the generation of the word "flaps." In the event that the gear is not down, a high signal on line 84 will inhibit gate 74 and thus the generation of the word "flaps." Thus it is apparent from the connection of line 84 to gate 74 that the word "gear" has priority over the word "flaps" in the event they are both not down.

Elements 48 through 96 represent an electronic analog computer circuit for controlling the generation of the various voice warnings as a function of altitude, speed, flap and gear setting. Although the preferred embodiment of the invention utilizes analog computer logic, a digital computer could be used to perform the same functions.

The voice signals, generated such as "too low, terrain", "too low, gear" and "too low, flaps" are the preferred words to be used in the system disclosed herein. However, it is not intended that the invention be limited to these words and the words are used in the specification and claims to describe in a generic sense the nature of the information being transmitted to the pilot. Likewise, the various values for the curves of FIGS. 1 and 2 and the values of the circuit elements of FIG. 3 are intended to illustrate the preferred embodiment of the invention and would most likely take on somewhat different values for different operating environments and aircraft types.

I claim:

1. A terrain clearance warning system for aircraft comprising:
   a radar altimeter for generating signals representing the aircraft's altitude above the terrain;
   a source of signals representing the aircraft's speed;
   a source of signals representing the position of aircraft landing gear;
   means, responsive to said speed signal, for generating a reference altitude signal as a function of aircraft speed;
   means, responsive to said altitude signals and said reference altitude signals, for comparing aircraft altitude above terrain with said reference altitude signal;
   means, responsive to said landing gear signal and speed signal and said comparing means for generating a first type of warning signal when the aircraft has descended below a first predetermined altitude below a predetermined speed with the landing gear up; and
   means, responsive to said landing gear signal, said speed signal and said comparing means for generating a second type of warning signal when the aircraft has descended below a second predetermined altitude above said predetermined speed with the landing gear up.

2. The system of claim 1 wherein said first warning signal means includes means for generating a too low, gear voice signal.

3. The system of claim 2 wherein said second warning signal means includes means for generating a too low, terrain voice signal.

4. The system of claim 3 wherein said second warning signal means varies, as a function of speed, the value of said second predetermined altitude.

5. A terrain warning system for aircraft comprising:
   a radar altimeter for generating signals representing the aircraft's altitude above the terrain;
   a source of signals representing the aircraft's speed;
   a source of signals representing the position of aircraft flaps;
   means, responsive to said altitude signal, said speed signal and said flap position signal for generating a first type of warning signal when the aircraft has descended below a first predetermined altitude below a first predetermined speed with the flaps up;
   means, responsive to said altitude signal, said speed signal and said flap signal for generating a second type of warning signal when the aircraft has descended below a second predetermined altitude above said first predetermined speed with the flaps up.

6. The system of claim 5 additionally including:
   a source of signals representing the position of the aircraft's landing gear;
   a means responsive to said altitude signal, said speed signal and said landing gear signal for generating a third type of warning signal when the aircraft has descended below a third predetermined altitude, below a second predetermined speed with the landing gear up.

7. The system of claim 6 wherein said first warning signal means includes means to generate a too low, flaps voice signal.

8. The system of claim 7 wherein said second warning signal means includes means to generate a too low, terrain voice signal.

9. The system of claim 8 wherein said third warning signal means includes means to generate a too low, gear voice signal.

10. The system of claim 9 wherein said second warning signal means varies, as a function of speed, said second predetermined altitude.

11. The system of claim 10 wherein said first predetermined altitude is 200 feet, said second predetermined altitude is 1,000 feet and said third predetermined altitude is 500 feet.

12. The system of claim 10 wherein said first predetermined speed is 0.28 Mach and said second predetermined speed is 0.35 Mach.

13. The system of claim 9 additionally including means for inhibiting said too low, flaps signal when said too low, gear signal has been initiated.

14. A terrain clearance warning system for aircraft comprising:
   a digitial memory;
   a digital to analog converter circuit operatively connected to said digital memory;
   a speaker operatively connected to said digital to analog converter;
   a memory address logic circuit operatively connected to said digital memory effective to selectively output from said digital memory groups of predetermined information bits;

a source of signals representing aircraft speed;

a radio altimeter for generating a signal representing the aircraft's altitude above ground;

a source of signals representing the position of the aircraft landing gear;

a source of signals representing the position of the aircraft's flaps;

an electronic computer responsive to said speed, altitude, flap and landing gear signals and operatively connected to said memory address logic, effective to cause the generation of a first type of vocie signal when the aircraft has descended below a first predetermined altitude below a first predetermined speed with the landing gear down, and a second type of voice signal when the aircraft has descended below a second predetermined altitude above said first predetermined speed.

15. The system of claim 14 wherein said electronic computer is additionally effective to cause the generation of a third type of voice signal when the aircraft has descended below a third predetermined altitude below a second predetermined speed with the flaps down.

16. The system of claim 15 wherein said electronic computer is additionally effective to inhibit said third voice signal when said first voice signal has been generated.

17. The system of claim 16 wherein said first voice signal is a too low, gear signal; said voice second signal is a too low, terrain signal; and said third voice signal is a too low, flaps signal.

18. The system of claim 17 wherein said electronic computer is an analog computer.

19. The system of claim 18 wherein said electronic analog computer includes a function generator circuit responsive to said speed signal for generating a scaled signal which is functionally related to speed.

20. The system of claim 19 wherein said electronic analog computer includes a comparator circuit which is operatively connected to said function generator and responsive to said altitude signal for generating a logic signal indicating aircraft descent below a predetermined value of altitude wherein said predetermined value is a function of speed.

21. A terrain clearance warning system for aircraft comprising:

a source of signals representing the aircraft's altitude above the terrain;

a source of signals representing the aircraft's speed;

a source of signals representing the position of the aircraft's landing gear; and computer means, responsive to said altitude signal said speed signal and said landing gear signal, for generating a too low, terrain voice warning when the aircraft is below a first predetermined altitude above the terrain and generating a too low, gear voice warning when the landing gear is up, below a predetermined speed.

22. The system of claim 21 wherein said computer means generates said too low, gear voice warning only below a second predetermined altitude.

23. The system of claim 21 wherein said first predetermined altitude is approximately 1,000 feet above the terrain.

24. The system of claim 21 wherein said second predetermined altitude is approximately 500 feet above the terrain.

25. The system of claim 21 wherein said computer means includes means for increasing the value of said first predetermined altitude as a function of speed.

26. The system of claim 22 wherein said computer means includes means for increasing the value of said first predetermined altitude as a function of speed.

27. The system of claim 26 wherein the value of said first predetermined altitude is equal to said second predetermined altitude at said predetermined speed and the value of said first predetermined altitude is increased as a linear function of increasing speed.

28. The system of claim 27 wherein said means for increasing the value of said first predetermined altitude includes means for limiting said first predetermined altitude to a maximum value for speeds greater than a second predetermined speed.

29. the system of claim 28 wherein said maximum value is approximately 1,000 feet.

30. The system of claim 28 wherein said second predetermined speed is approximately 0.45 Mach.

31. The system of claim 21 additionally including a source of signals representing the aircraft's flap position and wherein said computer means includes means for generating a too low, flaps voice warning below a third predetermined altitude when the landing gear is down and the flaps are not in a landing position.

32. The system of claim 31 wherein said third predetermined altitude is approximately 200 feet.

33. The system of claim 31 wherein said computer means include means for inhibiting said too low, flap voice warning above a second predetermined speed.

34. The system of claim 33 wherein said second predetermined speed is approximately 0.28 Mach.

35. The system of claim 33 wherein said computer means includes means for generating said too low, gear voice warning only when the landing gear is up and the aircraft is below said first predetermined speed.

36. The system of claim 35 wherein said first predetermined speed is approximately 0.35 Mach.

37. The system of claim 34 wherein said computer means includes means, responsive to said landing gear signal, for inhibiting said too low, flap signal when the landing gear is up.

38. The system of claim 33 wherein said computer means includes means for increasing the value of said first predetermined altitude as a function of increasing the aircraft speed.

39. The system of claim 38 wherein the value of said first predetermined altitude is equal to said third predetermined altitude at said first predetermined speed and the value of said first predetermined altitude to a maximum value at a third predetermined speed.

40. The system of claim 39 wherein said third predetermined speed is 0.45 Mach.

41. The system of claim 39 wherein said maximum value is 1,000 feet above the terrain.

42. A terrain clearance warning system for aircraft comprising:

a source of signals representing the aircrafts altitude above the terrain;

a source of signals representing the aircraft's speed;

a source of signals representing the position of the aircraft's flaps; and computer means, responsive to said altitude signal said speed signal and said flap signal, for generating a too low, terrain voice warning when the aircraft is below a first predetermined altitude and generating a too low, flap voice warning when the aircraft is below a predetermined speed with the flaps not in a landing position.

43. The system of claim 42 wherein said computer means generates said too low, flap voice warning below a second predetermined altitude.

44. The system of claim 42 wherein said first predetermined altitude is approximately 1,000 feet above the terrain.

45. The system of claim 42 wherein said second predetermined altitude is approximately 200 feet above the terrain.

46. The system of claim 43 wherein said first predetermined speed is approximately 0.28 Mach.

47. The system of claim 43 wherein said computer means includes means for increasing the value of said first predetermined altitude as a function of increasing speed.

48. The system of claim 45 wherein the value of said first predetermined altitude is equal to said second predetermined altitude at said first predetermined speed and is increased as a linear function of increasing speed.

49. The system of claim 47 wherein said means for increasing value of said first predetermined altitude additionally limits the value said first predetermined altitude to a maxim value for speeds greater than a second predetermined speed.

50. The system of claim 49 wherein said maximum value is approximately 1,000 feet.

51. The system of claim 49 wherein said second predetermined speed is approximately 0.45 Mach.

* * * * *

UNITED STATES PATENT AND TRADEMARK OFFICE
CERTIFICATE OF CORRECTION

PATENT NO. : 4,030,065
DATED : June 14, 1977
INVENTOR(S) : Charles Donald Bateman It is certified that error appears in the above–identified patent and that said Letters Patent are hereby corrected as shown below:

On the cover page, the Assignee line reading "Sundstrand Corporation, Rockford, Ill." should read --Sundstrand Data Control, Inc., Redmond, Washington--

*Signed and Sealed this*

*Eighteenth* Day of *October 1977*

[SEAL]

Attest:

RUTH C. MASON
*Attesting Officer*

LUTRELLE F. PARKER
*Acting Commissioner of Patents and Trademarks*